United States Patent Office 3,658,871
Patented Apr. 25, 1972

3,658,871
ALKOXY-BENZYL-DITHIOCARBAMIC
ACID ESTERS
Kiyoshi Matsushima, Masao Miyamoto, and Nobuo Fukazawa, Tokyo, Japan, assignors to Farbenfabriken Bayer Aktiengesellschaft, Leverkusen, Germany
No Drawing. Continuation-in-part of application Ser. No. 840,068, Mar. 6, 1969. This application Dec. 8, 1969, Ser. No. 883,344
Claims priority, application Japan, Mar. 11, 1968, 43/15,780
Int. Cl. C07c 155/08
U.S. Cl. 260—455 A                9 Claims

ABSTRACT OF THE DISCLOSURE

Alkoxy-benzyl-dithiocarbamic acid esters, i.e. alkoxy-benzyl- -N-alkyl-, -N,N-dialkyl- and piperidino- -dithiocarbamic acid esters, which possess herbicidal properties, and which may be produced by conventional methods.

---

This is a continuation-in-part application of copending U.S. application Ser. No. 840,068, filed Mar. 6, 1969, now abandoned.

The present invention relates to and has for its objects the provision for particular new alkoxy-benzyl-dithiocarbamic acid esters, i.e. alkoxy-benzyl- -N-alkyl-, -N,N-dialkyl- and piperidino- -dithiocarbamic acid esters, which possess herbicidal properties, active compositions in the form of mixtures of such compounds with solid and liquid dispersible carrier vehicles, and methods for producing such compounds and for using such compounds in a new way especially for combating weeds, undesired plants, and the like, with other and further objects becoming apparent from a study of the within specification and accompanying examples.

Pentachlorophenol (A), often designated as PCP, is known to be usable for controlling barnyard grasses, (e.g. *Echinochloa sp.*). However, PCP is remarkably toxic to human skin and mucous membranes, is very difficult to formulate into herbicidal compositions, and exhibits a peculiar toxicity to fish life. For the control of simultaneously occurring slender spikerushes (*Eleocharis acicularis*), 2-methyl-4-chloro-phenoxyacetic acid (B), often designated as MCP, is similarly usable. A disadvantage of using MCP as a herbicide, however, is that while it is effective against slender spikerushes it is not effective for the control of barnyard grasses. Hence, a mixture of PCP and MCP is employed conventionally for simultaneous control of barnyard grasses and slender spikerushes, especially in rice cultivations, since these two weeds normally occur in rice paddies.

It has now been found, in accordance with the present invention, that the particular new alkoxy-benzyl-dithiocarbamic acid esters of the formula $$RO-\underset{}{\bigcirc}-CH_2-S-\overset{S}{\underset{\|}{C}}-Z \quad (I)$$

in which
R is lower alkyl, and
Z is lower alkylamino, dilower alkylamino or piperidino, exhibit strong hericidal, especially selective herbicidal, properties.

It has been furthermore found, in accordance with the present invention, that a process for the production of the particular new compounds of Formula I above may be provided, which comprises reacting an alkoxy-benzyl halide of the formula $$RO-\underset{}{\bigcirc}-CH_2-Hal \quad (II)$$

in which
R is the same as defined above, and
Hal is a halogen atom such as chloro, bromo, fluoro or iodo, especially chloro, with a dithiocarbamic acid compound of the formula $$M-S-\overset{S}{\underset{\|}{C}}-Z \quad (III)$$

in which
Z is the same as defined above, and
M is a hydrogen atom, an alkali metal atom such as sodium, potassium, lithium, and the like, or an ammonium group.

Surprisingly, the particular new alkoxy-benzyl-dithiocarbamic acid esters according to the present invention exhibit both a higher and more specific herbicidal effectiveness than the previously known pentachlorophenol (A) and 2-methyl-4-chloro-phenoxyacetic acid (B), especially against weeds in rice cultivations, and particularly a herbicidal effect against both barnyard grasses and slender spikerushes which occur together in rice paddy cultivations, while also exhibiting a comparatively low toxicity to warm-blooded animals and fish life and a concomitantly low phytotoxicity to higher plants such as rice. The active compounds of the present invention exhibit a characteristic selectivity among plants of the Graminae family, especially as between barnyard grasses and rice, which is ascribable to the differences in root absorption therebetween and which results in said very low phytotoxicity to rice plants. Moreover, the instant compounds are capable of controlling weeds without any disturbing influence by reason of their application at the time of tillering, prior to transplanting, a practice which has not been found appropriate heretofore. Therefore, the instant compounds represent a valuable contribution to the art.

The general process for the preparation of the instant compounds is illustrated by the following reaction scheme:

$$RO-\underset{}{\bigcirc}-CH_2-Hal + M-S-\overset{S}{\underset{\|}{C}}-Z \longrightarrow$$
$$(II) \qquad\qquad (III)$$
$$RO-\underset{}{\bigcirc}-CH_2-S-\overset{S}{\underset{\|}{C}}-Z + M-Hal$$
$$(I)$$

The starting materials to be used are already known and are clearly characterized by the Formulae II and III stated above.

Advantageously, in accordance with the present invention, in the various formulae herein:

R represents:
straight and branched chain lower alkyl hydrocarbon such as methyl, ethyl, n- and iso-propyl, n-, iso-, sec.- and tert.-butyl, n- and iso-amyl, n- and iso-hexyl, and the like, especially $C_{1-6}$ or $C_{1-4}$ or $C_{1-3}$ alkyl, and more especially 2-, 3- or 4-position lower alkyl, such that RO is 2-, 3- or 4-position lower alkoxy; and Z represents:
lower alkylamino such as methyl to isohexyl inclusive, as defined above, and the like, -amino, especially $C_{1-6}$ or $C_1-C_4$ or $C_1-C_3$ or $C_1-C_2$ alkylamino, and more especially methylamino; or dilower alkylamino such as di- (same or mixed) methyl to isohexyl inclusive, as defined above, and the like, -amino, especially di $C_{1-6}$ or $C_{1-4}$ or $C_{1-3}$ or $C_{1-2}$ alkylamino, and more especially dimethylamino; or piperidino.

Preferably, R is $C_{1-4}$ or $C_{1-3}$ alkyl; and Z is mono or di $C_{1-4}$ alkylamino or piperidino.

As examples of alkoxy-benzyl halides of Formulae II above which may be used as starting materials, there are mentioned: 2-, 3- and 4-methoxy, ethoxy, n-propoxy, isopropoxy, n-butoxy, isobutoxy, sec.-butoxy, tert.-butoxy, n-amyloxy, isoamyloxy, n-hexyloxy, isohexyloxy, and the like, benzyl -chlorides, bromides, fluorides and iodides.

As examples of dithiocarbamic acid compounds of Formula III above which may be used as starting materials, there are mentioned: N- and N,N-di- -methyl, ethyl, n-propyl, isopropyl, n-butyl, isobutyl, sec.-butyl, tert.-butyl, n-amyl, isoamyl, n-hexyl, isohexyl, and the like, as well as piperidino, -dithiocarbamic acids, and the corresponding sodium, potassium, lithium and ammonium salts, and the like.

Suitable inert organic solvents include hydrocarbons, such as benzine and benzene; chlorinated hydrocarbons, such as methylene chloride, ethylene chloride, carbon tetrachloride and dichlorobenzene; ethers, such as diethyl ether, dibutyl ether and dioxan; ketones, such as acetone, cyclohexanone and methylethyl ketone; alcohols such as methanol, ethanol, propanol and butanol; and acetonitrile and dimethyl formamide; and the like.

A basic substance, preferably a tertiary amine or an alkali metal hydroxide or carbonate, such as triethylamine, pyridine, dimethyl-cyclohexylamine, dimethylaniline, dimethyl-benzylamine, sodium hydroxide, potassium hydroxide, sodium carbonate, and the like, may be added as acid-binding agent where the free dithiocarbamic acid, rather than alkali metal or ammonium salt, is used.

The reaction temperature can be varied within a fairly wide range. In general, the reaction is carried out at substantially between about 40–120° C., preferably at between about 60–110° C.

Approximately equimolar amounts of the starting materials are preferably used, although an excess of one of the reactants is not detrimental. Usually the alkoxybenzyl halide is added to a heated solution of the starting dithiocarbamic acid compound in an inert organic solvent and the mixture is refluxed for about 1–3 hours, and then filtered from the salt precipitate. The filtrate is concentrated and the final compound often crystallizes upon standing. Such crystals can be purified by recrystallization from a suitable solvent, such as alcohol. Where the free dithiocarbamic acid is used, an alkali metal hydroxide or carbonate or a tertiary amine may be added to the reaction mixture as acid-binding agent.

The resulting final compounds are either oily or crystalline substances which are soluble in the usual organic solvents while being only difficultly soluble in water.

Advantageously, the particular new active compounds according to the present invention exhibit strong herbicidal activity and are distinguished by a selective herbicidal activity against weeds, especially in rice cultivations. Their low toxicity to warm-blooded animals and their good compatibility with higher plants permits the instant new compounds to be used as excellent plant protection agents against weeds. In the concentrations normally used for the control of weeds, the instant compounds do not damage cultivated plants.

By weeds are meant in the widest sense all plants which grow in cultivations, especially rice paddy cultivations, or in other places where they are not desired.

The particular new active compounds according to the present invention are particularly effective against rice paddy weeds, such as barnyard grasses (Echinochloa) and slender spikerushes (*Eleocharis acicularis*) as well as broad leaf weeds including, for instance, *Rotala indica* Koehne var. *uliginosa* Miquel, *Monochoria vaginalis* Presl., false pimpernels (*Lindernia pyxidaria* Linnaeus), and the like.

By reason of their excellent properties mentioned above, the particular new active compounds according to the present invention can thus be used with especially effective results against rice paddy weeds which hitherto had to be controlled with herbicidal agents which were somewhat harmful to man and fish life, and moreover for the joint and simultaneous control of both barnyard grasses and slender spikerushes. This is a substantial advantage, i.e. in agriculture, both from a labor-saving and an economical standpoint, since up to now, as aforesaid, agents from different chemical groups or classes usually had to be used, respectively, against these two types of weeds.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, wettable powders or spray powders, pastes, aerosols, oils, soluble powders, dusting agents, granules, pellets, tablets, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluents or carriers including inert organic solvents and non-solvents (e.g. non-solvents which can disperse or dissolve the active compounds with the aid of adjuvants), such as aromatic hydrocarbons (e.g. benzene, toluene, xylene, dimethyl naphthalene, aromatic naphthas, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, diatomaceous earth, clay, montmorillonite, pumice, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying or wetting agents, such as non-ionic, cationic and/or anionic emulsifying or wetting agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other herbicides, or fungicides, insecticides, acaricides, nematocides, bactericides, plant growth controlling agents, etc., including organo-phosphorus compounds, carbamate compounds, chlorinated compounds, dinitro compounds, organic sulfur or copper compounds, substituted phenoxy compounds, chlorophenols, substituted diphenyl ethers, anilide compounds, triazine compounds, urea compounds, antibiotics, and other known agricultural chemicals and/or fertilizers and their adjuvants including wetting agents and adhesive agents, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–30%, preferably 0.05–5%, by weight of the mixture. Thus, the present invention contemplates over-all compositions which comprise mixtures of a conventional dispersible carrier vehicle such as (1) a dispersible inert finely divided carrier solid, and/or (2) a dispersible liquid such as an inert organic solvent or non-solvent and/or water, preferably including a surface-active effective amount of a carrier vehicle assistant, e.g. a surface-active agent, such as an emulsifying agent and/or a dispersing agent, and an amount of the active compound which is effective for the purpose in question and which is generally about 0.001–95%, and preferably 0.05–95%, by weight of the mixture.

In particular, the amount of active compound per unit area varies according to the purpose intended and the mode of application. In general, substantially between about 10–1000 grams, preferably 100–600 grams, of active compound per 10 areas are applied.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns; or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight, of the active compound, or even the 100% active substance alone, e.g. about 20–100% by weight of the active compound.

In particular, the present invention contemplates methods of selectively killing, combating or controlling undesired plants, e.g. weeds and the like, which comprise applying to at least one of (a) such weeds and (b) their habitat, i.e. the locus to be protected, a herbicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, dressing, via incrustation; and the like.

When used in hgher quantities per unit area (e.g. between about 20–40 kg. of active compound per hectare) the instant compounds are non-selective herbicides, whereas when used at lower quantities per unit area (e.g. between about 2.5–5 kg. of active compound per hectare) such compounds are excellent selective herbicides.

The active compounds are especially effective as pre-emergence herbicides, although they may also be used as post-emergence herbicides.

It will be realized, of course, that the concentration of the particular active compound utilized in admixture with the carrier vehicle will depend upon the intended application. Therefore, in special cases, it is possible to go above or below the aforementioned concentration ranges and ranges of amounts per unit area.

The following illustrate, without limitation, examples of formulations which may be used in accordance with the present invention:

FORMULATION A

Five percent by weight of 4-methoxy-benzyl-N,N-dimethyl-dithiocarbamate (4) and 95% by weight of a mixture of talc and clay (3:1) are crushed and mixed to form a dust formulation. It is applied as is by dusting onto weeds and/or their habitat.

FORMULATION B

Twenty percent by weight of 2-methoxy-benzyl-N,N-dimethyl-dithiocarbamate (8), 75% by weight of a mixture of talc and clay (3:2), 3% by weight of sodium alkylbenzenesulfonate, and 2% by weight of sodium dinaphthylmethane disulfonate are mixed and pulverized to form a wettable powder which is diluted with water to a concentration of 1 to 500 and applied by spraying onto weeds and/or their habitat.

FORMULATION C

Twenty percent by weight of 4-methoxy-benzyl-N,N-di-n-propyl-dithiocarbamate (7), 75% by weight of xylol, and 5% by weight of the emulsifier Sorpol (trade name of the product of Toho Kagaku Kogyo k.k., Japan: polyoxyethylenealkylarylether) are mixed and stirred to form an emulsion which is diluted with water to a concentration of 1 to 1000 and applied by spraying onto weeds and/or their habitat.

FORMULATION D 4-methoxy-benzyl-N,N-diisopropyl-dithiocarbamate (6) is dissolved in xylol while heating. The resulting solution is sprayed onto granular clay during rotary mixing of the mass until about 10% by weight of the active compound is contained in the clay. The resulting granular composition is used by applying directly to the surface of soil.

The herbicidal effectivness of the particular new compounds of the present invention is illustrated, without limitation, by the following examples:

EXAMPLE 1

Test against weeds of paddy fields

Preparation of active compounds:

Carrier vehicle: 5 parts by weight of acetone or 5 parts by weight of talc
Emulsifier: 1 part by weight of benzyloxypolyglycolether To produce a suitable preparation of the particular active compound, 1 part by weight of such active compound is mixed with the stated amount of carrier vehicle and the stated amount of emulsifier intimately, and the resulting emulsifiable concentrate or wettable powder is then diluted with water to the desired final concentration.

Test method: Pots of $\frac{1}{5,000}$ a. are charged with paddy field soil and then filled with water. Paddy rice seedlings (Jukkoku variety) of 3 leaves stage are transplanted into the pots under irrigated conditions. After the seedlings have taken root, seeds of barnyardgrass and broad-leaved weeds are sown and spikerush are planted in such pots simultaneously.

The preparations of the given active compound are sprayed at the rate of 500, 250 and 125 g. of active compound per 10 a. onto the soil of pots. After 3 weeks, the degree of damage against the barnyardgrass, spikerush and broad-leaved weeds and the phytotoxicity to the paddy rice are determined and characterized by the values 0 to 5, which have the following scales:

Herbicidal efficacy:
5 Plants are completely dead or no germination occurs
4 Plants are partially destroyed or 20% or less germinated
3 Plants are remarkably damaged 50% or less germinated
2 Plants are markedly damaged or 70% or less germinated
1 Plant is slightly damaged or 90% or less germinated
0 No effect Phytotoxicity
5 plants are completely dead.
4 remarkable damage.
3 marked damage.
2 small damage.
1 slight damage.
0 no phytotoxicity.

The particular active compounds tested, the amounts used, and the results obtained can be seen from the following Table 1:

The following further examples illustrate, without limitation, the process for producing the particular new compounds of the present invention.

EXAMPLE 2

4-methoxy-benzyl-N,N-dimethyl-dithocarbamate ($4_2$)

Sodium N,N-dimethyl-dithiocarbamate (28.6 g.–0.2 mol) are introduced into a 500 ml. three-necked flask, and dissolved by addition of 300 ml. of acetone thereto. The resulting solution is heated and then refluxed over a water bath, and while stirring, a solution of 31.3 g. (0.2 mol) of 4-methoxy-benzyl chloride in 50 ml. of acetone is added dropwise. After the addition has been completed (requiring about 30 minutes), the mixture is refluxed for an additional 2 hours. At the end of the reaction, the resulting reaction mixture is cooled. The salt precipitate is separated by filtration. The filtrate is concentrated, and left to stand in a cold place so that the intended final

TABLE 1.—TEST RESULTS OF HERBICIDAL EFFECT

| Active compound No. Compounds of invention: | Concentration of active compound in g./10 acres | [Pre-emergence] Herbicidal effect | | | Phytotoxicity, Rice |
|---|---|---|---|---|---|
| | | Barnyard grass | Slender spikerush | Broadleaved weeds | |
| ($1_1$) | 500 | 4 | 3 | 4 | 0 |
| | 250 | 3–4 | 3 | 4 | 0 |
| | 125 | 3 | 3 | 3 | 0 |
| ($2_1$) | 500 | 4 | 4 | 4 | 0 |
| | 250 | 4 | 3 | 3 | 0 |
| | 125 | 3 | 3 | 3 | 0 |
| ($3_1$) | 500 | 5 | 4 | 4 | 0 |
| | 250 | 4 | 4 | 4 | 0 |
| | 125 | 4 | 3 | 3 | 0 |
| ($4_1$) | 500 | 5 | 5 | 5 | 0 |
| | 250 | 5 | 5 | 5 | 0 |
| | 125 | 4 | 3 | 5 | 0 |
| ($5_1$) | 500 | 5 | 5 | 5 | 0 |
| | 250 | 5 | 5 | 5 | 0 |
| | 125 | 4 | 3 | 3 | 0 |
| ($6_1$) | 500 | 5 | 5 | 5 | 0 |
| | 250 | 5 | 5 | 5 | 0 |
| | 125 | 4 | 3 | 4 | 0 |
| ($7_1$) | 500 | 5 | 5 | 5 | 0 |
| | 250 | 4 | 4 | 4 | 0 |
| | 125 | 4 | 3 | 3 | 0 |
| ($8_1$) | 500 | 5 | 5 | 5 | 0 |
| | 250 | 5 | 5 | 5 | 0 |
| | 125 | 4 | 3 | 4 | 0 |
| ($9_1$) | 500 | 5 | 5 | 5 | 0 |
| | 250 | 5 | 5 | 5 | 0 |
| | 125 | 5 | 4 | 5 | 0 |
| ($10_1$) | 500 | 5 | 4 | 5 | 0 |
| | 250 | 4–5 | 4 | 4 | 0 |
| | 125 | 4 | 3 | 3 | 0 |
| ($11_1$) | 500 | 5 | 5 | 5 | 0 |
| | 250 | 5 | 5 | 5 | 0 |
| | 125 | 4 | 3 | 3 | 0 |
| ($12_1$) | 500 | 5 | 5 | 5 | 0 |
| | 250 | 5 | 4 | 5 | 0 |
| | 125 | 4 | 2 | 3 | 0 |
| ($13_1$) | 500 | 5 | 5 | 5 | 0 |
| | 250 | 5 | 4 | 5 | 0 |
| | 125 | 4 | 3 | 4 | 0 |
| ($14_1$) | 500 | 5 | 5 | 5 | 0 |
| | 250 | 5 | 4 | 5 | 0 |
| | 125 | 4 | 4 | 4 | 0 |
| ($15_1$) | 500 | 5 | 5 | 5 | 0 |
| | 250 | 5 | 4 | 4 | 0 |
| | 125 | 4 | 4 | 4 | 0 |
| ($16_1$) | 500 | 5 | 5 | 5 | 0 |
| | 250 | 5 | 4 | 5 | 0 |
| | 125 | 4 | 3 | 3 | 0 |
| ($17_1$) | 500 | 5 | 5 | 5 | 0 |
| | 250 | 5 | 5 | 5 | 0 |
| | 125 | 4–5 | 4 | 5 | 0 |
| ($18_1$) | 500 | 5 | 4–5 | 4–5 | 0 |
| | 250 | 5 | 4 | 4 | 0 |
| | 125 | 4 | 3 | 4 | 0 |
| Known compounds, comparison: | | | | | |
| (A) PCP (commercial grade; control) | 1,000 | 5 | 5 | 5 | 1 |
| | 500 | 3 | 2 | 4 | 0 |
| | 250 | 0 | 0 | 2 | 0 |
| (B) MCP (commercial grade; control) | 50 | 4 | 5 | 5 | 4 |
| | 25 | 2 | 5 | 5 | 0 |
| | 12.5 | 0 | 2–3 | 2 | 0 |
| (C) Benzyl-N,N-dimethyl dithiocarbamate (control) | 500 | 5 | 5 | 5 | 0 |
| | 250 | 4 | 2 | 4 | 0 |
| | 125 | 2 | 1 | 2 | 0 |
| (D) S-benzyl-N,N-diisopropyl-thiolcarbamate | 500 | 5 | 5 | 5 | 4 |
| | 250 | 4 | 4 | 4 | 3 |
| | 125 | 3 | 2–3 | 3 | 1 |
| Non-treated | | 0 | 0 | 0 | 0 |

NOTE.—Compounds of invention have corresponding numbers to those in Table 2 below broad-leaved weeds are *Monochoria vaginalis, Rotala indica, Lindernia pyxidaria, Gratiola japonica*, etc.

product crystallizes. The obtained crude crystals are recrystallized from alcohol to give 42.4 g. of 4-methoxy-benzyl-N,N-dimethyl-dithiocarbamate in the form of colorless crystals having a melting point of 65–67° C. (yield 88% of theory).

*Elemental analysis.*—Calculated (percent): C, 54.74; H, 6.31; N, 5.82. Found (percent): C, 54.12, H, 5.91; N, 5.97.

EXAMPLE 3

4-methoxy-benzyl-N,N-diisopropyl-dithiocarbamate ($6_2$)

Twenty grams (0.1 mol) of sodium N,N-diisopropyl-dithiocarbamate are mixed with 100 ml. of methyl-ethyl ketone, and the mixture is introduced into a 300 ml. three-necked flask. The mixture is heated to 80–85° C. over a water bath, and while stirring, a solution of 16 g. (0.1 mol) of 4-methoxybenzyl chloride in 50 ml. of methyl-ethyl ketone are added dropwise. After the addition has been completed (requiring about 15 minutes), the resulting mixture is heated at 85–95° C. for an additional hour to complete the reaction. The resulting reaction mixture is cooled, and the salt precipitate is separated by filtration. The filtrate is concentrated under reduced pressure, and left to stand while cooling. Crude crystals of the intended final product are thereby obtained. The crude crystals are recrystallized from alcohol to give 27.3 g. of 4-methoxy-benzyl-N,N-diisopropyl-dithiocarbamate in the form of colorless crystals having a melting point of 116–118° C. (yield 91.6% of theory).

*Elemental analysis.*—Calculated (percent): C, 60.60; H, 7.79; N, 4.71. Found (percent): C, 59.87; H, 7.81; N, 4.53.

In analogous manner, other compounds of the present invention can be readily synthesized as well.

The following Table 2 illustrates appropriate data for typical compounds of the present invention.

TABLE 2

| Compound | Structural formula | Chemical name | Properties |
|---|---|---|---|
| ($1_2$) | $CH_3O-C_6H_4-CH_2-S-C(=S)-NH-CH_3$ | 4-methoxy-benzyl-N-methyldithiocarbamate. | M.P. 88–89° C. |
| ($2_2$) | $CH_3O-C_6H_4-CH_2-S-C(=S)-NH-C_2H_5$ | 4-methoxy-benzyl-N-ethyldithiocarbamate. | M.P., 58–59° C. |
| ($3_2$) | $CH_3O-C_6H_4-CH_2-S-C(=S)-N(CH_3)(C_4H_{9}\text{-}n)$ | 4-methoxy-benzyl-N-methyl-N-n-butyl-dithiocarbamate. | B.P. 189–191° C./0.4 mm. Hg. |
| ($4_2$) | $CH_3O-C_6H_4-CH_2-S-C(=S)-N(CH_3)_2$ | 4-methoxy-benzyl-N,N-dimethyldithiocarbamate. | M.P. 65–67° C. |
| ($5_2$) | $CH_3O-C_6H_4-CH_2-S-C(=S)-N(C_2H_5)_2$ | 4-methoxy-benzyl-N,N-diethyldithiocarbamate. | M.P. 33–34° C. |
| ($6_2$) | $CH_3O-C_6H_4-CH_2-S-C(=S)-N(C_3H_7\text{-}i)_2$ | 4-methoxy-benzyl-N,N-diisopropyl-dithiocarbamate. | M.P. 116–118° C. |
| ($7_2$) | $CH_3O-C_6H_4-CH_2-S-C(=S)-N(C_3H_7\text{-}n)_2$ | 4-methoxy-benzyl-N,N-di-n-propyl-dithiocarbamate. | B.P. 178–179° C./0.3 mm. Hg. |
| ($8_2$) | 2-$OCH_3$-$C_6H_4$-$CH_2-S-C(=S)-N(CH_3)_2$ | 2-methoxy-benzyl-N,N-dimethyldithiocarbamate. | B.P. 167–169° C./0.03 mm. Hg (M.P. 69–70° C.). |
| ($9_2$) | 2-$OCH_3$-$C_6H_4$-$CH_2-S-C(=S)-N(C_2H_5)_2$ | 2-methoxy-benzyl-N,N-diethyldithiocarbamate. | B.P. 167–169° C./0.1 mm. Hg. |
| ($10_2$) | 2-$OCH_3$-$C_6H_4$-$CH_2-S-C(=S)-N(C_3H_7\text{-}i)_2$ | 2-methoxy-benzyl-N,N-diisopropyldithiocarbamate. | M.P. 87–89° C. |
| ($11_2$) | 3-$CH_3O$-$C_6H_4$-$CH_2-S-C(=S)-N(CH_3)_2$ | 3-methoxy-benzyl-N,N-dimethyldithiocarbamate. | M.P. 25–26° C. |
| ($12_2$) | $CH_3O-C_6H_4-CH_2-S-C(=S)-$piperidino | 4-methoxy-benzyl-1'-piperidinodithiocarbamate. | B.P. 180–184° C./0.5–1 mm. Hg. |
| ($13_2$) | $C_2H_5O-C_6H_4-CH_2-S-C(=S)-N(CH_3)_2$ | 4-ethoxy-benzyl-N,N-dimethyldithiocarbamate. | B.P. 178–180° C./0.05 mm. Hg (M.P. 78–80° C.). |

TABLE 2—Continued

| Compound | Structural formula | Chemical name | Properties |
|---|---|---|---|
| (14₂) | C₂H₅O—⟨⟩—CH₂—S—C(=S)—N(C₂H₅)₂ | 4-ethoxy-benzyl-N,N-diethyldithiocarbamate. | M.P. 28–29° C. |
| (15₂) | C₂H₅O—⟨⟩—CH₂—S—C(=S)—N(C₃H₇-i)₂ | 4-ethoxy-benzyl-N,N-diisopropyldithiocarbamate. | M.P. 86–87° C. |
| (16₂) | 2-OC₂H₅-C₆H₄—CH₂—S—C(=S)—N(CH₃)₂ | 2-ethoxy-benzyl-N,N-dimethyldithiocarbamate. | Oil. |
| (17₂) | i-C₃H₇O—⟨⟩—CH₂—S—C(=S)—N(C₂H₅)₂ | 4-isopropoxybenzyl-N,N-diethyldithiocarbamate. | B.P. 174–175° C./0.25 mm. Hg. |
| (18₂) | i-C₃H₇O—⟨⟩—CH₂—S—C(=S)—N(C₃H₇-i)₂ | 4-isopropoxybenzyl-N,N-diisopropyldithiocarbamate. | M.P. 78–79° C. |

It will be realized by the artisan that all of the foregoing compounds contemplated by the present invention possess the desired strong and selective herbicidal properties, and especially the capability of controlling and destroying selectively weeds in rice cultivations, as well as a comparatively low toxicity toward warm-blooded creatures and fish life and a concomitantly low phytotoxicity to higher plants such as rice, and the like, enabling such compounds to be used with correspondingly favorable compatibility with respect to warm-blooded creatures and fish and higher plants for more effective control and/or elimination of weeds by application of such compounds to such weeds and/or their habitat. As contemplated herein, the term "weeds" is meant to include not only weeds in the narrow sense, but also weeds in the broad sense, whereby to cover all plants and vegetation considered undesirable for the particular purpose in question.

It will be appreciated that the instant specification and examples are set forth by way of illustration and not limitation, and that various modifications and changes may be made without departing from the spirit and scope of the present invention.

What is claimed is:

1. Alkoxy-benzyl-dithiocarbamic acid ester of the formula

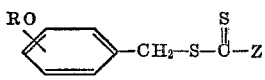

in which R is lower alkyl, and Z is dilower alkylamino.

2. Compound according to claim 1 wherein R is alkyl of 1–6 carbon atoms, and Z is dialkylamino of 1–6 carbon atoms in each alkyl moiety.

3. Compound according to claim 1 wherein R is C₁₋₄ alkyl, and Z is selected from the group consisting of di C₁₋₄ alkylamino.

4. Compound according to claim 1 wherein such compound is 4 - methoxy - benzyl - N,N - dimethyl - dithiocarbamic acid ester of the formula

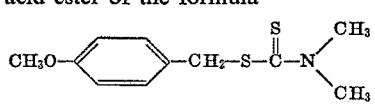

5. Compound according to claim 1 wherein such compound is 2 - methoxy - benzyl - N,N - diethyl - dithiocarbamic acid ester of the formula

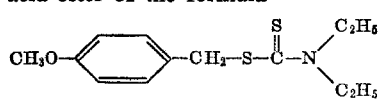

6. Compound according to claim 1 wherein such compound is 4 - methoxy - benzyl - N,N - diisopropyl - dithiocarbamic acid ester of the formula

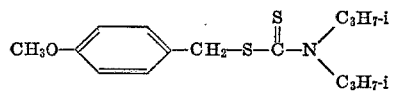

7. Compound according to claim 1 wherein such compound is 3 - methoxy - benzyl - N,N - dimethyl - dithiocarbamic acid ester of the formula

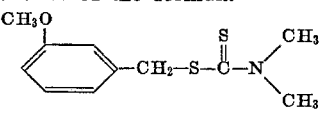

8. Compound according to claim 1 wherein such compound is 2 - methoxy - benzyl - N,N - diethyl - dithiocarbamic acid ester of the formula

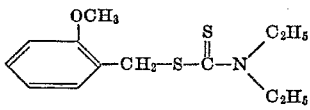

9. Compound according to claim 1 wherein such compound is 4 - isopropoxy - benzyl - N,N - diethyl - dithiocarbamic acid ester of the formula

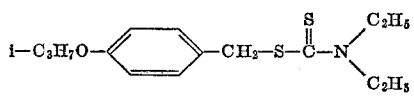

References Cited

UNITED STATES PATENTS

| | | | |
|---|---|---|---|
| 2,992,091 | 7/1961 | Harman et al. | 71—100 |
| 3,202,572 | 8/1965 | Werres et al. | 260—455 |
| 3,532,488 | 10/1970 | Husted | 260—455 |

FOREIGN PATENTS

| | | | |
|---|---|---|---|
| 633,613 | 12/1963 | Belgium | 260—455 |
| 886,426 | 1/1962 | Great Britain | 71—101 |

OTHER REFERENCES

Mel'nikov et al., "Organic Insectofungicides Etc.," (1968), CA 69, No. 51760e (1968).

Matsushima et al., "Dithiocarbamate Esters," (1968), CA 70, No. 57389h (1969).

Matsushima et al., "Orididal Effects of Aromatic Esters, Etc.," (1966), CA No. 43534c (1967).

LEWIS GOTTS, Primary Examiner

G. HOLLRAH, Assistant Examiner

U.S. Cl. X.R.

71—94, 101, 116, 122; 260—293.4

UNITED STATES PATENT OFFICE
CERTIFICATE OF CORRECTION

Patent No. 3,658,871        Dated April 25, 1972

Inventor(s) Kiyoshi Matsushima, Masao Miyamoto and Nobuo Fukazawa

It is certified that error appears in the above-identified patent and that said Letters Patent are hereby corrected as shown below:

Col. 7, Table 1

For Active Compound No. ($17_1$) in column headed "Slender spikerush"
delete                                   "5"
and substitute                 -- 4 --

Col. 11, line 69

For                                         "2-methoxy"

read                                    -- 4-methoxy --

Col. 12, line 68

After "CA"

insert                                  -- 67 --

Signed and sealed this 5th day of December 1972.

(SEAL)
Attest:

EDWARD M. FLETCHER, JR.          ROBERT GOTTSCHALK
Attesting Officer                       Commissioner of Patents